United States Patent
Chung et al.

(10) Patent No.: US 11,762,485 B2
(45) Date of Patent: Sep. 19, 2023

(54) WRITING DEVICE WITH ELECTROMAGNETIC TRACKING

(71) Applicant: GOOGLE LLC, Mountain View, CA (US)

(72) Inventors: Sherk Chung, Piedmont, CA (US); Saket Patkar, Mountain View, CA (US); Advait Jain, Santa Clara, CA (US); Lucine Oganesian, Mountain View, CA (US); Ian Atkinson, Castro Valley, CA (US); Murphy Stein, San Jose, CA (US); Xiaomi Mao, Mountain View, CA (US); Tri Duc Pho, San Bruno, CA (US); Joseph Ethier, San Jose, CA (US); Jacob Andrew Sharf, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 9 days.

(21) Appl. No.: 17/283,764

(22) PCT Filed: Oct. 9, 2019

(86) PCT No.: PCT/US2019/055396
§ 371 (c)(1),
(2) Date: Apr. 8, 2021

(87) PCT Pub. No.: WO2020/076950
PCT Pub. Date: Apr. 16, 2020

(65) Prior Publication Data
US 2021/0333897 A1    Oct. 28, 2021

Related U.S. Application Data

(60) Provisional application No. 62/743,030, filed on Oct. 9, 2018.

(51) Int. Cl.
*G06F 3/03* (2006.01)
*G06F 3/0354* (2013.01)
(Continued)

(52) U.S. Cl.
CPC .......... *G06F 3/03545* (2013.01); *B43K 29/08* (2013.01); *G06V 30/333* (2022.01)

(58) Field of Classification Search
CPC .... G06F 3/03545; G06F 3/011; G06F 3/0304; G06F 3/0346; G06F 3/03; B43K 29/08; G06V 30/333
See application file for complete search history.

(56) References Cited

U.S. PATENT DOCUMENTS

2009/0153526 A1    6/2009   Blake et al.
2012/0038549 A1*   2/2012   Mandella ................ G06F 3/011
                                                                345/156

(Continued)

FOREIGN PATENT DOCUMENTS

JP    2004 272377 A    9/2004
JP    3 958003 B2      8/2007
WO    2017/044051 A1   3/2017

OTHER PUBLICATIONS

International Search Report and Written Opinion dated Jan. 9, 2020 for corresponding International Application No. PCT/US2019/055396, 18 pages.

(Continued)

*Primary Examiner* — Lunyi Lao
*Assistant Examiner* — Jarurat Suteerawongsa (57) ABSTRACT

An electromagnetic (EM) pose tracking system includes a computer input device having a pen or stylus form factor. In some embodiments, a base station device includes one of the transmitter (Tx) or receiver (Rx) module for the EM pose tracking system while the computer input device includes the other of the TX and receiver modules. The EM pose tracking system employs the Tx and Rx modules to collect EM pose data indicating a relative pose between the Tx and Rx modules. Based on the EM pose data, the EM pose tracking system (or a computer device working with the EM pose tracking system) identifies a pose (position, orientation, or both position and orientation) of the computer input device.

35 Claims, 8 Drawing Sheets

(51) Int. Cl.
*B43K 29/08* (2006.01)
*G06V 30/32* (2022.01)

(56) References Cited

U.S. PATENT DOCUMENTS

| | | | | |
|---|---|---|---|---|
| 2013/0120237 A1* | 5/2013 | DiVerdi | ............. | G06F 3/03545 |
| | | | | 345/156 |
| 2013/0251249 A1* | 9/2013 | Huo | .................... | G06K 9/6256 |
| | | | | 382/161 |
| 2013/0314381 A1 | 11/2013 | Altman et al. | | |
| 2014/0085270 A1* | 3/2014 | Obata | ................. | G06F 3/03545 |
| | | | | 345/179 |
| 2016/0139691 A1* | 5/2016 | Li | ....................... | G06F 3/03545 |
| | | | | 345/179 |
| 2018/0299976 A1* | 10/2018 | Chiewcharnpipat | ......................... | |
| | | | | G06F 3/0346 |
| 2019/0187779 A1* | 6/2019 | Miller | .................... | G08C 17/02 |
| 2020/0264724 A1* | 8/2020 | Ong | ................... | G06F 3/04162 |

OTHER PUBLICATIONS

Communication pursuant to Rules 161(1) and 162 EPC dated May 19, 2021 for corresponding European Application No. 119794826.8, 3 pages.
International Preliminary Report on Patentability dated Apr. 22, 2021 for PCT Application No. PCT/US2019/055396, 10 pages.
Communication pursuant to Article 94(3) EPC dated Feb. 7, 2023 for corresponding European Application No. 19794826.8, 8 pages.

* cited by examiner

FIG. 11

WRITING DEVICE WITH ELECTROMAGNETIC TRACKING

BACKGROUND

The present disclosure relates generally to input devices for computing platforms, and more particularly to input devices having a stylus or pen form factor.

DESCRIPTION OF THE RELATED ART

The form factor of a computer input device can have a substantial impact on the user experience with a computing platform. Accordingly, to enhance the user experience, computer input devices have been developed that have a pen or stylus form factor. These devices allow the user to hold the input device in a comfortable position with which the user is familiar (i.e. a comfortable writing position). Further, devices with a pen/stylus form factor support relatively precise control by the user, thereby improving the user experience with a variety of applications, such as drawing and painting applications, writing applications, and the like. However, conventional input devices with a pen/stylus form factor typically have limited positional tracking in two dimensions, thereby limiting utility of the devices for applications that employ three-dimensional spaces, such as virtual reality (VR) and augmented reality (AR) applications. Further, conventional pen/stylus input devices sometimes require the user to write on a special surface, such as a specially-designed tablet or paper, in order to track position of the input device. These special surfaces limit the portability and flexibility of the input device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-11 illustrate techniques for employing an electromagnetic (EM) pose tracking system with a computer input device having a pen or stylus form factor. In some embodiments, a base station device includes one of the transmitter (Tx) or receiver (Rx) module for the EM pose tracking system while the computer input device includes the other of the TX and receiver modules. The EM pose tracking system employs the Tx and Rx modules to collect EM pose data indicating a relative pose between the Tx and Rx modules. Based on the EM pose data, the EM pose tracking system (or a computer device working with the EM pose tracking system) identifies a pose (position, orientation, or both position and orientation) of the computer input device. In some embodiments, the pose is identified in a six degree of freedom (6DoF) space, thereby supporting user input for applications employing such a space, such as a VR or AR application. Furthermore, the EM pose tracking system supports identification of the pose without requiring line-of-sight between the base station and the input device, and without requiring a special writing surface, thereby enhancing the flexibility of the input device. In addition, the components of the EM pose tracking system, such as an EM coil, can be inserted into the input device without requiring a substantial increase in the size of the input device, allowing the input device to maintain the pen or stylus form factor, and thus enhancing the user experience.

For convenience, the term "writing device" is used herein to refer to a computer input device having a pen or stylus form factor as described further herein. It will be appreciated that in some embodiments the writing device can include a writing material, such as an ink reservoir or graphite, that supports writing on a medium (e.g., paper) independent of pose tracking. In other embodiments, the writing device does not include a writing material, but includes a nub or tip that supports use of the device on a display screen or other surface. Further, it will be appreciated that the writing device can be employed for uses other than handwriting, including drawing, selection and manipulation of objects in a computer application, including CAD, AR, or VR application, or any other use for which a stylus can provide input to a computer.

Figure 1:
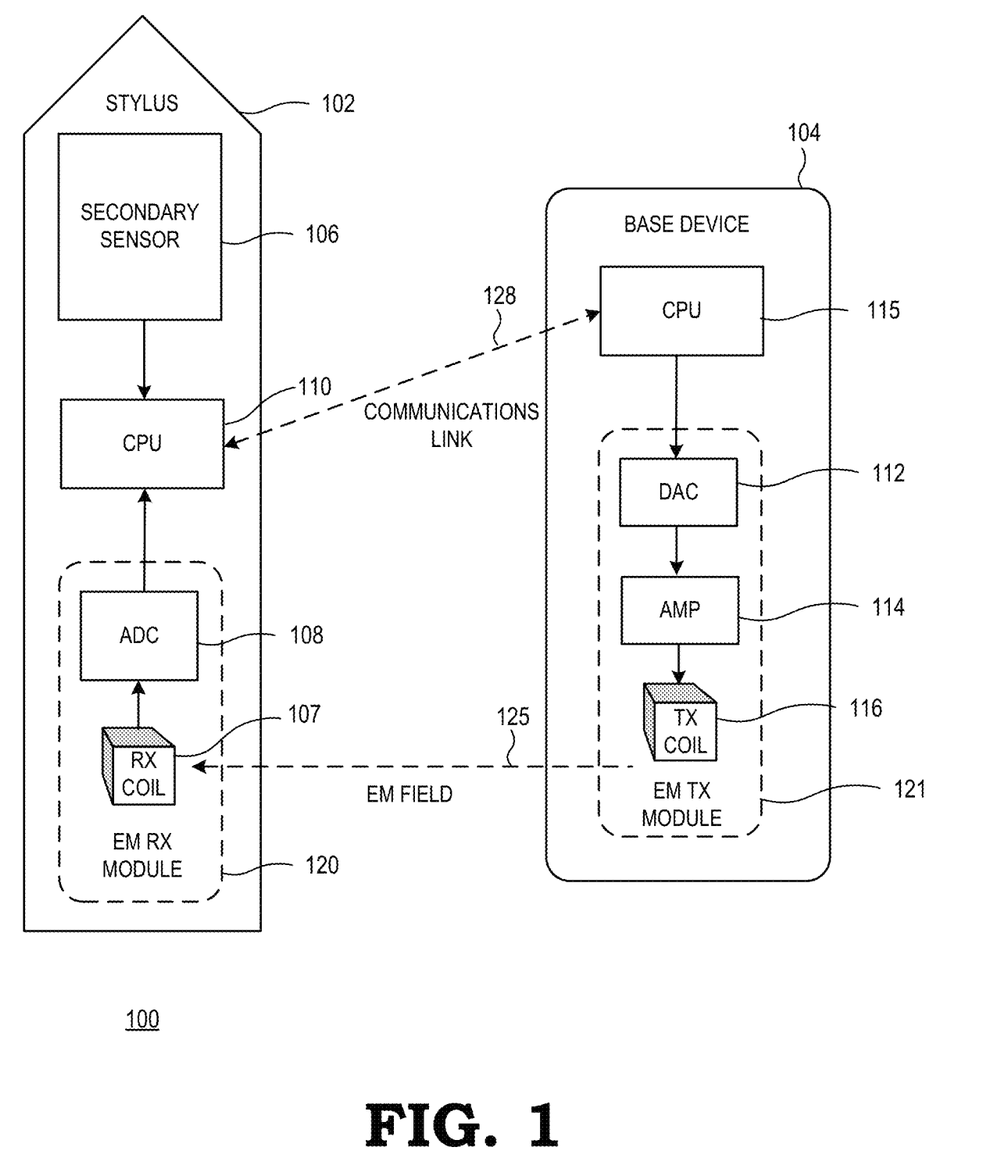
FIG. 1 is a block diagram of an electromagnetic (EM) pose tracking system for a writing device employed for computer input in accordance with some embodiments.

FIG. 1 illustrates a tracking system 100 that employs EM poses to identify poses of a writing device, illustrated as stylus 102. In the depicted example, the tracking system 100 includes a base device 104 and the stylus 102. The base device 104 can be part of or connected to a computer device, a base station independent of a computer device, or can be a mobile device in some embodiments. As described further herein, the tracking system 100 is generally configured to identify poses of the stylus 102 based on a weighted combination of EM poses (poses generated based on an EM field 125 as described further herein) and secondary poses (poses generated based on data provided by a secondary sensor 106). The tracking system 100 can therefore be incorporated into a variety of devices and systems that employ pose identification features. For example, in some embodiments the tracking system 100 is incorporated in a virtual reality (VR) system to identify the pose of the stylus 102 to allow a user to employ the stylus 102 to manipulate objects in a VR environment. Thus, in some configurations, the base device 104 is a head mounted display (HMD) that displays the VR environment to the user. In other configurations, the base device 104 is a device separate from the HMD (such as an accessory or a base-station). It will be appreciated that other configurations of the tracking system 100 can be employed. For example, in some embodiments the tracking system 100 does not employ a secondary sensor 106 and generates poses for the stylus 102 based only on EM pose data.

To generate an EM pose, the tracking system 100 generates the EM field 125, measures a magnitude and/or phase of the generated EM field 125 (referred to herein generally as "EM data"), and computes a relative pose based on the corresponding EM data. In the illustrated embodiment, the EM field 125 is generated by the base device 104 and the EM data is read at the stylus 102. It will be appreciated that other configurations are possible, including the EM field 125 being generated by the stylus 102 and the EM data being read at the base device 104, as illustrated below at FIG. 2. To support generation of the EM field, the base device 102 includes a Tx module 121, whereby the Tx module 121 includes a transmitter coil 116 and an amplifier 114. In some embodiments, the transmitter coil 116 is a tri-axis coil generally configured to generate the EM field 125 at a strength, referred to herein as the transmit power, wherein the transmit power is based on electrical power provided by the amplifier 114 to the transmitter coil 116. The amplifier 114 is a programmable amplifier generally configured to generate the electrical power at a magnitude based on received control signaling. Thus, the transmit power for the EM field 114 is a programmable value that is controlled at the base device 102. The Tx module further includes a digital-to-analog DAC converter 112 that converts values provided by a CPU 115 of the base device 104 to supply the input to the amplifier 114. In other embodiments, the amplifier 114 is a non-programmable amplifier, and magnitudes of the EM field can be changed simply by reducing the amplitude of the source signal, which could be done digitally or via the DAC. The CPU 115 can perform other operations on behalf of the base device 104 and the tracking system 100, including generation of poses for the stylus 102 as described further herein. In other embodiments one or more of these operations can be performed by the CPU 110 or by a third CPU.

To support reading of EM data, the stylus 102 includes an Rx module 120 having a receiver coil 107 and an analog-to-digital converter (ADC) 108. In some embodiments, the receiver coil 107 is a tri-axis coil configured to generate an analog electrical signal having a magnitude and/or phase indicative of a detected EM field 125. In some embodiments, such as described further below with respect to FIG. 4, the receiver coil 107 may have fewer than three coils. The ADC 108 is generally configured to receive the generated analog signal and convert the analog signal to a digital value indicative of the analog signal, and therefore indicative of the detected EM field 125. Thus, in the example of FIG. 1, the digital values generated by the ADC 108 are EM data that can be used for pose identification as described further below.

To support generation of poses, the stylus 102 includes a secondary sensor 106 configured to generate non-EM pose information for the stylus 102. In some embodiments the secondary sensor is an inertial measurement unit (IMU). In other embodiments, the secondary sensor is part of a secondary tracking system (not illustrated at FIG. 1) that generates secondary pose information based on a secondary tracking signal, such as a light-based signal (e.g., a laser, LED light, and the like), a sonic signal (e.g., an ultrasonic signal), and a radio frequency (RF) signal To support pose identification (that is, identification of poses of either the base device 102 or the mobile device 104) the stylus 102 and the base device 104 include processors 110 and 115 respectively. The processors 110 and 115 are general-purpose or application-specific processors generally configured to execute instructions (e.g., computer programs) in order to carry out specified tasks. In some embodiments, at least one of the processors 110 and 115 executes instructions to identify a pose associated to the base device 102 or the mobile device 104 based on a weighted combination of the EM data provided by the ADC 108 and the secondary pose data generated by the secondary sensor 106. In other embodiments, a different processor on an external system (such as a PC computer, for example) is used to compute pose. In one example, in some embodiments, the processor 110 identifies the pose based on the following formula:

$$\text{pose}_{final} = (W_{em} * \text{pose}_{em} + W_{secondary} * \text{pose}_{secondary}) / (W_{em} + W_{secondary})$$

where $W_{em}$ is the weight applied to the pose computed from the EM signal, $\text{pose}_{em}$ is the pose computed from the EM data, $W_{secondary}$ is the weight applied to the pose computed from the secondary tracking signal 136, and $\text{pose}_{secondary}$ is the pose computed from the secondary tracking signal.

In addition, in the example of FIG. 1 the processors 110 and 115 are connected via a communication link 128 to support communication of EM data, secondary pose data, identified poses, or other information. For example, in some embodiments the processor 110 identifies poses based on the EM data and secondary pose data and communicates the identified poses to the processor 115. In other embodiments, the processor 110 communicates the EM data and the secondary pose data to the processor 115, which identifies poses based on the weighted combination. The communication link 128 can be a wired communication link, a wireless communication link (e.g. Bluetooth), and the like, or a combination thereof. In other embodiments, the EM data and the secondary pose data can be sent to a third processor (not pictured) where the pose is computed from the weighted combination of the EM data and the secondary pose data.

In some embodiments, one or more of the processors 110 and 115 (or a third processor not shown at FIG. 1) execute additional sets of instructions to use the poses determined based on the EM data and the secondary pose data. For example, in some embodiments the processor 115 can execute sets of instructions to display a virtual reality environment to a user and employ the identified poses to determine a location of the stylus 102 in the virtual reality environment, thereby allowing the user to interact with the virtual reality environment using the stylus 102. In some embodiments, the stylus 102 is used for capturing handwriting or a hand drawing. The user can write or draw (e.g. with an ink or pencil tip) on paper and the writing or drawing is captured by a computing device based on poses of the stylus 102, allowing the writing or drawing to be displayed at the computing device. In other embodiments, the stylus 102 is used as a stylus on a computer screen in typical stylus use cases. In these embodiments, the stylus could be used to annotate, write, or as regular mouse input. In still other embodiments, the stylus 102 is used as a 3D mouse to manipulate 3D virtual objects. For example, the stylus 102 can be used instead of a "space mouse" to manipulate rotation or displacement of 3D CAD drawings.

Figure 2:
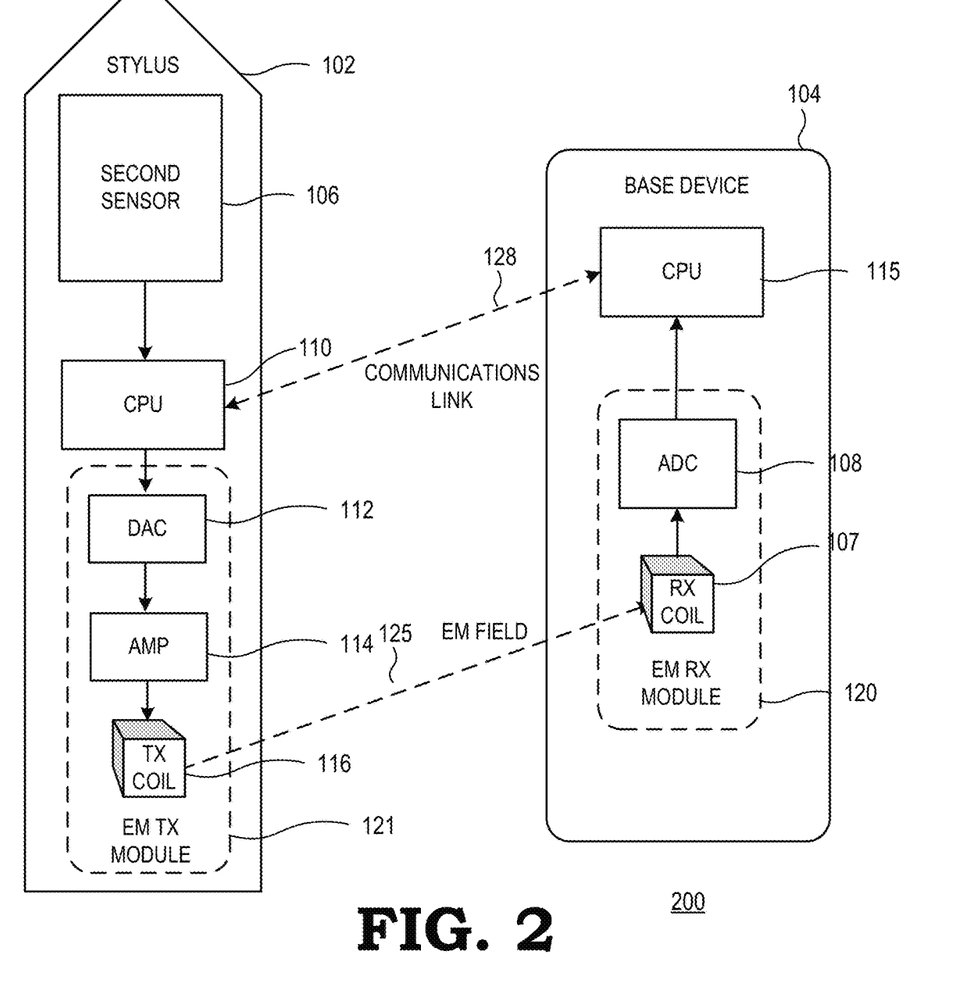
FIG. 2 is a block diagram of another example of an EM pose tracking system for a writing device employed for computer input in accordance with some embodiments.

As noted above, in some embodiments the Tx and Rx modules of the tracking system 100 are in reverse positions relative to FIG. 1. An example is illustrated at FIG. 2, which illustrates a tracking system 200 in accordance with some embodiments. The tracking system 200 includes similar components to those described above with respect to the tracking system 100. However, for the tracking system 100 the TX module 121 is located at the stylus 102 while the Rx module 120 is located at the base device 104. The components perform similarly to the corresponding components of FIG. 1 to support generation of poses for the stylus 102.

Figure 3:
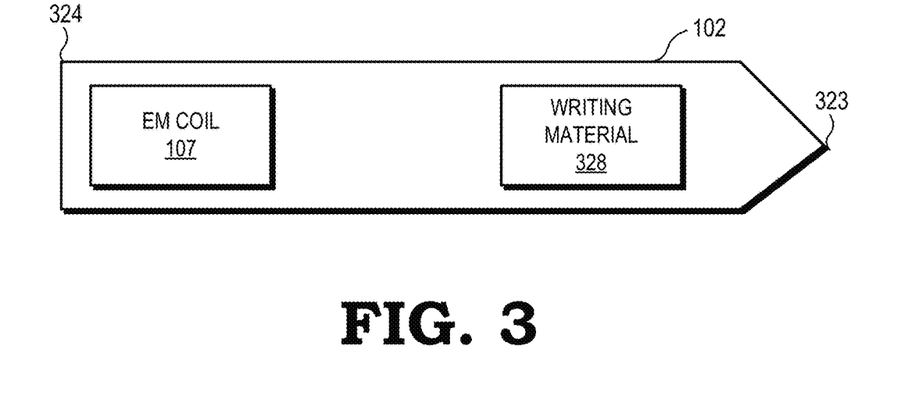
FIG. 3 is a block diagram illustrating a writing device that can be used in conjunction with the EM pose tracking systems of FIG. 1 and FIG. 2 in accordance with some embodiments.

It will be appreciated that the stylus 102 can be any kind of writing device. FIG. 3 illustrates an example embodiment of the stylus 102 that can be employed to write on paper or other media while concurrently generating poses for the stylus 102. In the depicted example, the stylus 102 includes both the EM coil 107 to support generation of EM poses, and also includes writing material 328. The writing material 328 can be any kind of writing material that is dispensed from a tip 323 of the stylus 102 onto a writing surface (e.g. paper or other medium) as a user moves the stylus 102. Thus, in some embodiments the writing material 328 is ink contained in a reservoir, wherein both the reservoir and the EM coil are placed within a housing that forms the outside of the stylus 102. In other embodiments, the stylus 102 is a pencil and the writing material 328 is graphite that is contained within a housing of the stylus 102 and is dispensed at the tip 323 of the stylus 102. In other embodiments, the stylus 102 includes a non-writing nib configured to be placed on a computer or tablet screen or other surface.

In some cases, metal or other material situated in close proximity to the Rx module 120 or to the Tx module 121 can cause distortions in the EM field 125, and these distortions can result in inaccuracies in the EM pose data. For example, if the stylus 102 is being used to write on a table containing metal, such that the tip 323 is close to the metal, the resulting distortions in the EM field 125 can cause errors in the EM pose data, resulting in pose tracking errors for the stylus 102, and in turn resulting in a poor user experience. However, the distortions in the EM field can be mitigated by placing the EM coil 107 at a distance from the surface that is causing the distortion. For example, in some embodiments, including the example embodiment of FIG. 3, the EM coil 107 is placed relatively close to an end 324 of the stylus 102, the end 324 opposite the tip 323. The EM coil 107 is therefore relatively far away from the distorting surface when the tip 323 is in contact with that surface, thereby reducing distortions in the EM field 125 and in turn improving the accuracy of the EM pose data.

Figure 4:
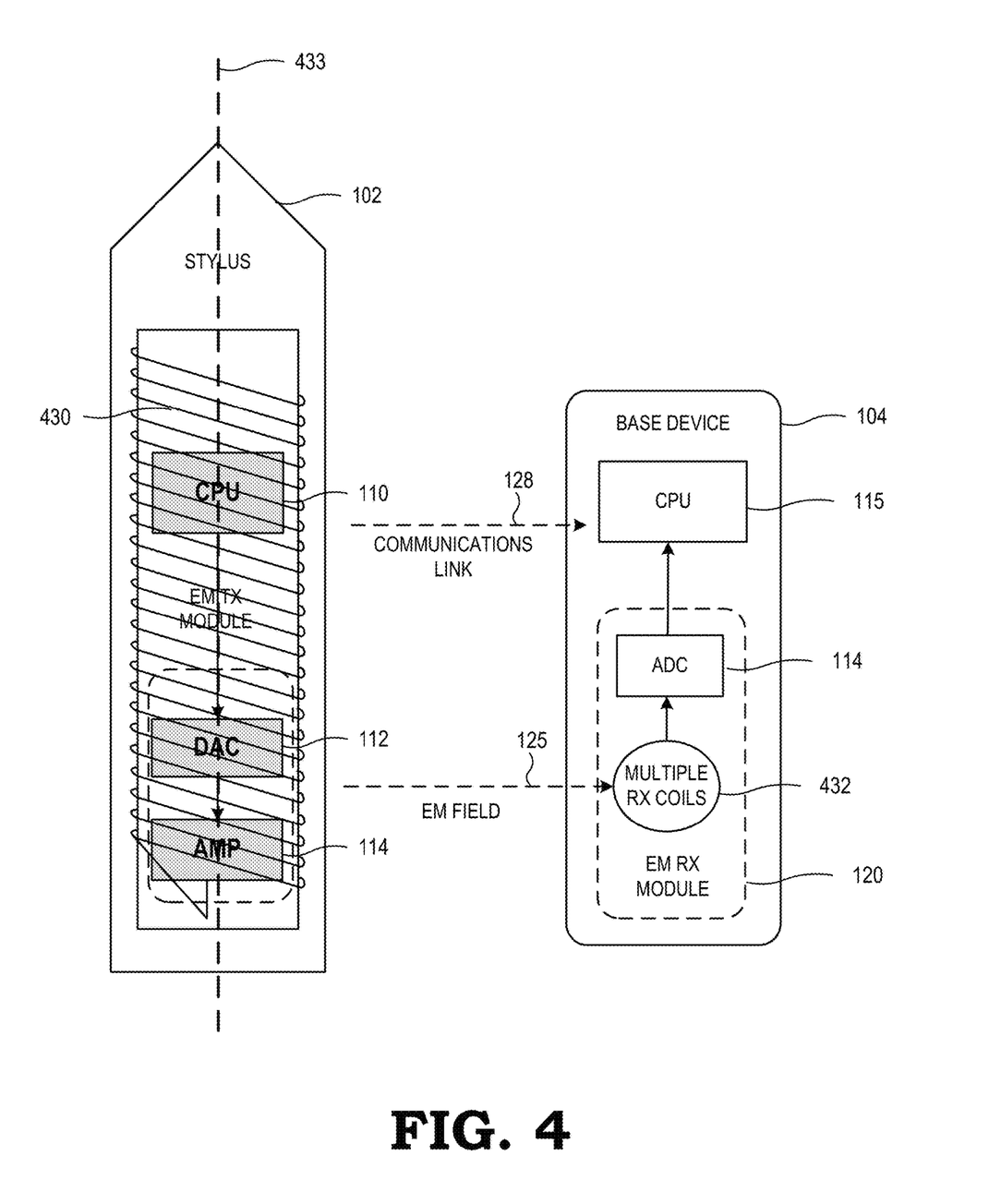
FIG. 4 is a block diagram illustrating an example of an EM pose tracking system with a writing device using a single coil in the writing device in accordance with some embodiments.

In some cases, it may be desirable to reduce the cost or size of the circuitry in the stylus 102. An example is illustrated at FIG. 4 in accordance with some embodiments. In the depicted embodiment, the stylus 102 and base device 104 are configured similarly to the embodiment of FIG. 2. However, the stylus 102 employs an EM coil 430 that is wound around an axis 433 along the length of the stylus 102, which allows the EM coil 430 to be placed within the housing of the stylus 102 with relatively small impact on the form factor of the stylus 102. In some embodiments, the EM coil 430 is the only coil employed by the Rx module. In other embodiments, the Rx module employs EM coils in addition to the EM coil 430. In addition, by winding the coil 432 along the length of the stylus 102, the coil 132 can be implemented with a relatively high number of turns. As is understood in the art, the strength of the EM field 125 is proportional to the number of turns in the coil, such that a long coil wound around the stylus 102 allows for higher signal-to-noise ratio in the EM data while having a relatively small impact on the size of the stylus 102.

Figure 5:
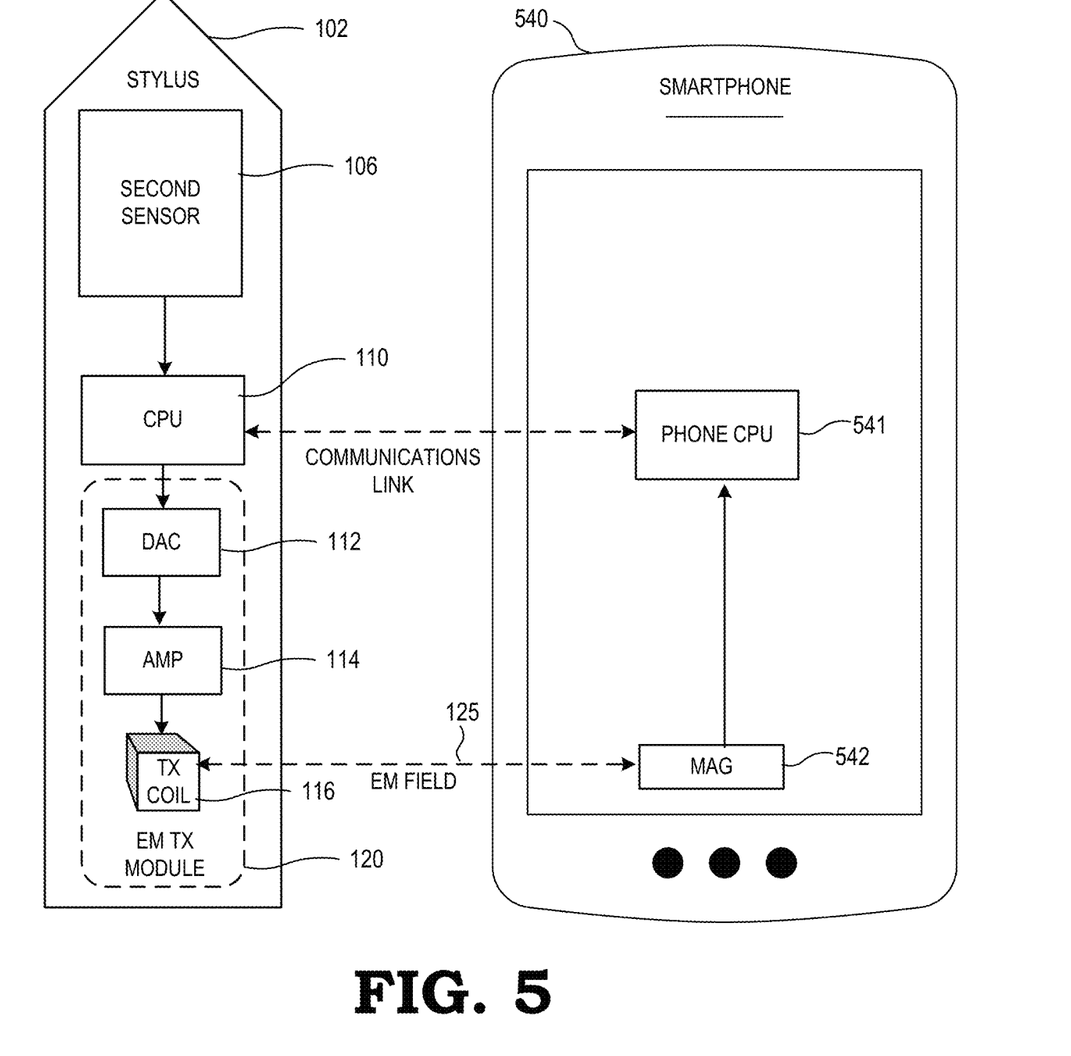
FIG. 5 is a block diagram illustrating an example of employing an EM pose tracking system for a writing device in conjunction with a portable device such as a smartphone in accordance with some embodiments.

In some embodiments, the tracking system can reduce the overall cost of the system by employing existing EM components of a computer, smartphone or other device. An example is illustrated at FIG. 5. In the depicted example, the stylus 102 is configured similarly to the embodiment of FIG. 2, including the EM Tx module 120 and the second sensor 106. However, in the illustrated example, the base device is a smartphone 540 including a CPU 541 and a magnetometer 542. In some embodiments, the magnetometer 542 is a 3-axis magnetometer embedded in the smartphone 540 and used for different smartphone operations, such as providing compass-like capabilities. The CPU 541 is configured to control the magnetometer 542 to operate in similar fashion to the EM coil 107 of FIGS. 1-2, and in particular to collect EM pose data from readings of the EM field 125. That is, by using the magnetometer 542 as the base coil for reading EM signals transmitted by the stylus 102, the CPU 541 can act as the "base" and collect EM pose data from the magnetometer 542, which can then be converted to EM poses by the CPU 541.

In some embodiments, the magnetometer 542 has a relatively low sample rate (e.g. in the 50-200 Hz range) which does not readily allow for frequency multiplexing of the EM fields, and accordingly the stylus 102 can employ a pulsed EM configuration which is better suited for these magnetometers. For smartphones with magnetometers or other magnetic sensor with higher sampling rates, EM fields can be multiplexed over different frequencies for simultaneous transmission.

Figure 6:
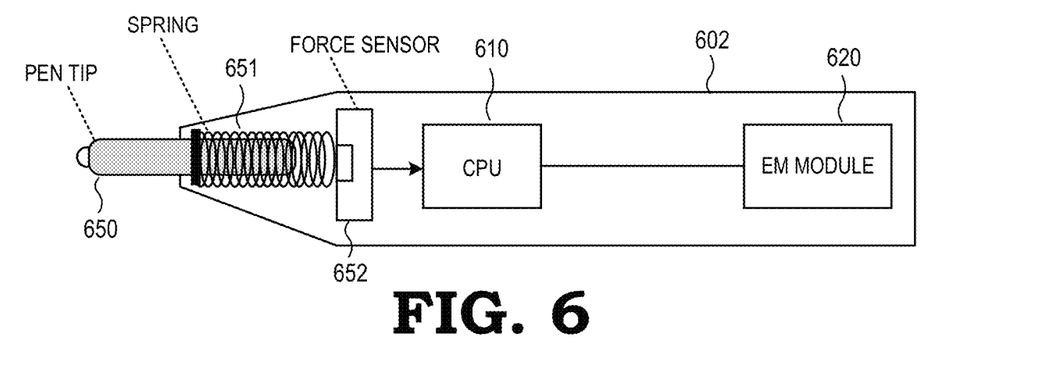
FIG. 6 is a block diagram illustrating a writing device employing a force sensor that can be used in conjunction with the EM position tracking systems of FIG. 1 and FIG. 2 in accordance with some embodiments.
Figure 7:
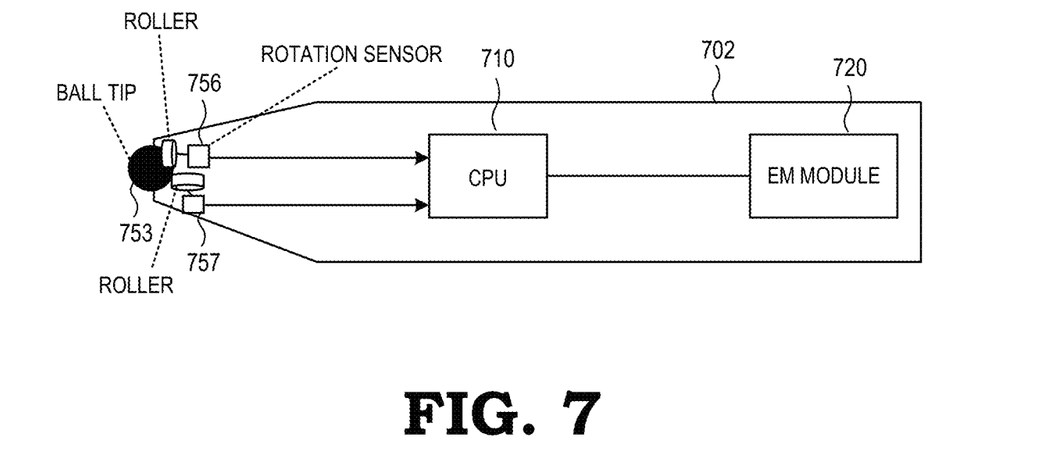
FIG. 7 is a block diagram illustrating a writing device employing a rotation sensor that can be used in conjunction with the EM position tracking systems of FIG. 1 and FIG. 2 in accordance with some embodiments.
Figure 8:
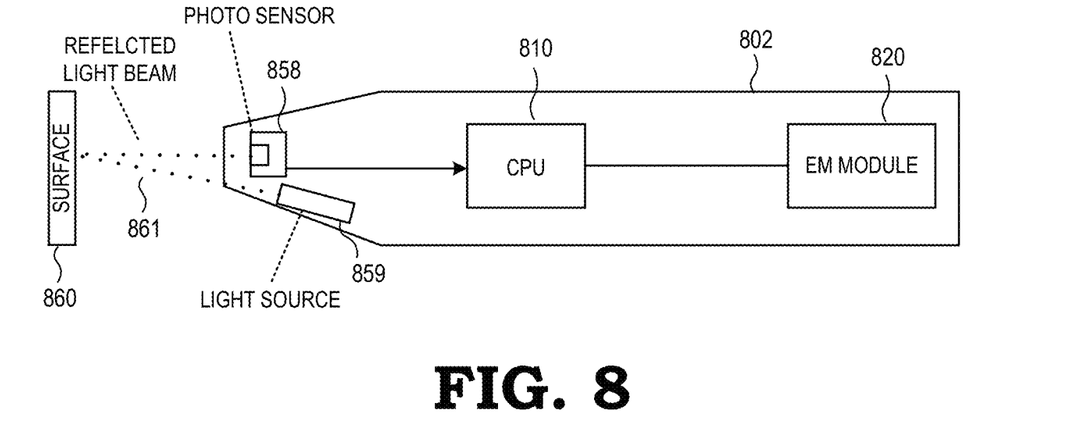
FIG. 8 is a block diagram illustrating a writing device employing a photo sensor that can be used in conjunction with the EM position tracking systems of FIG. 1 and FIG. 2 in accordance with some embodiments.

It will be appreciated that the stylus 102, instead of or in addition to supporting the deposition of writing material on a surface, can employ different configurations of the stylus tip. The different tips can support improved pose detection, additional stylus functionality, or a combination thereof. Examples of different stylus tip configurations are illustrated at FIGS. 6-8 in accordance with some embodiments. FIG. 6 illustrates a stylus 602 including a CPU 610 and an EM module 620. The EM module 620 can be a Rx EM module similar to the Rx EM module 120 of FIG. 1, or a Tx EM module similar to the Tx EM module 121 of FIG. 2. Accordingly, the stylus 602 can be employed instead of the stylus 102 in any of the embodiments described with respect to FIGS. 1-5 above.

The stylus 602 employs a force sensitive tip configuration, composed of a tip 650, a spring 651, and a force sensor 652, which can be a mechanical force sensor or an electrical force sensor. In some embodiments, the spring 651 is omitted. When the tip 650 contacts a surface (e.g. when a user places the tip 650 on a screen or other writing surface), the force of the surface against the tip translates down the tip applying a force that is sensed by the force sensor 652, which indicates the sensed force to the CPU 610. In some embodiments, the force sensor 652 indicates the sensed force to the CPU 610 via a binary signal to indicate whether the force at the tip 650 has crossed a specified or programmable threshold. In other embodiments, the force sensor 652 indicates the level of the sensed force to the CPU 610 via an electrical (digital or analog) signal, thereby indicating variable levels of pressure at the tip 650. Based on the information provided by the force sensor 652, the CPU 610 can take one or more specified actions, such as executing an application, changing an application parameter (such as the thickness, shade, color, or other aspect of a displayed or stored line), and the like.

In some embodiments, such as the example of FIG. 7, the stylus can employ a tip that is used to assist in pose identification for the stylus. FIG. 7 illustrates a stylus 702 including a CPU 710 and an EM module 720. As with FIG. 6, the EM module 720 can be a Rx EM module similar to the Rx EM module 120 of FIG. 1, or a Tx EM module similar to the Tx EM module 121 of FIG. 2. Further, the stylus 702 can be employed instead of the stylus 102 in any of the embodiments described with respect to FIGS. 1-5 above. The stylus 702 has a tip configuration that acts as a 2-D sensor when dragged against an arbitrary flat surface, simulating a pen. The configuration includes a ball tip 753 and rollers and rotation sensor pairs 756 and 757. As the user moves the stylus over the surface, the ball tip 753 rotates. The roller and rotation sensor pairs 756 and 757 sense the rotation of the ball tip and based on the rotation provide 2-D pose information to the CPU 710. For example, in some embodiments the roller and rotation sensor pair 756 indicates the position of the tip 753 along a "y" axis and the roller and rotation sensor pair 757 indicate the position of the tip 753 along a corresponding "x" axis. The 2-D pose information can be used to check or augment the pose identified based on the EM pose data as described above.

In some embodiments, such as the example of FIG. 8, instead of tracking the 2-D position of the tip via a mechanical configuration, the stylus can employ optical sensing. FIG. 8 illustrates a stylus 802 including a CPU 810 and an EM module 820. As with FIG. 6, the EM module 820 can be an Rx EM module similar to the Rx EM module 120 of FIG. 1, or a Tx EM module similar to the Tx EM module 121 of FIG. 2. Further, the stylus 802 can be employed instead of the stylus 102 in any of the embodiments described with respect to FIGS. 1-5 above. The stylus 802 includes a light source 859 and a photo sensor 858. The light source 859 is configured to emit a light beam 861 via a tip of the stylus 802. The light beam 861 is reflected off a surface 860 external to the stylus 802, such as writing surface, computer screen, and the like. The photosensor 858 uses the reflected light beam to capture images of the surface 860 and provides the images to the CPU 810. The CPU 810 compares each captured image to previous captured images to determine a direction of movement of the stylus across the surface 860. The CPU 810 can employ the identified direction of movement to augment or check the pose identified based on the EM pose data.

It will be appreciated that any of the stylus embodiments described above, including the styli 102, 602, 702, and 802, can include additional components to provide additional inputs or other information to a computer device. For example, the stylus can include one or more buttons to indicate additional input data to the computer device. The one or more buttons can be placed in convenient location for the user such as, if the stylus is held like a pen or pencil, one of the buttons is placed at or near the user's index finger while another button is placed at or near the user's thumb. In some embodiments, a button can be placed at an end of the stylus opposite the tip, in a similar location as the button for a retractable ball point pen. Additionally, the stylus can incorporate, in some embodiments, a slider, 1-D trackpad, roller, or similar component (or a combination thereof) that allows for 1-dimensional linear input. In some embodiments, the 1-D linear input component is placed near the front of the stylus in the location where, when held as a pen, the index finger would normally be placed. In other embodiments, the component is placed closer to the middle for easy access when the stylus is held as a wand. In other embodiments, the stylus can include a 2-D trackpad, joystick, or similar component that allows for 2-D analog input into the stylus. In some embodiments, the 2-D analog input component is placed closer to the middle for easy access with the thumb when the stylus is held as a wand.

Figure 9:
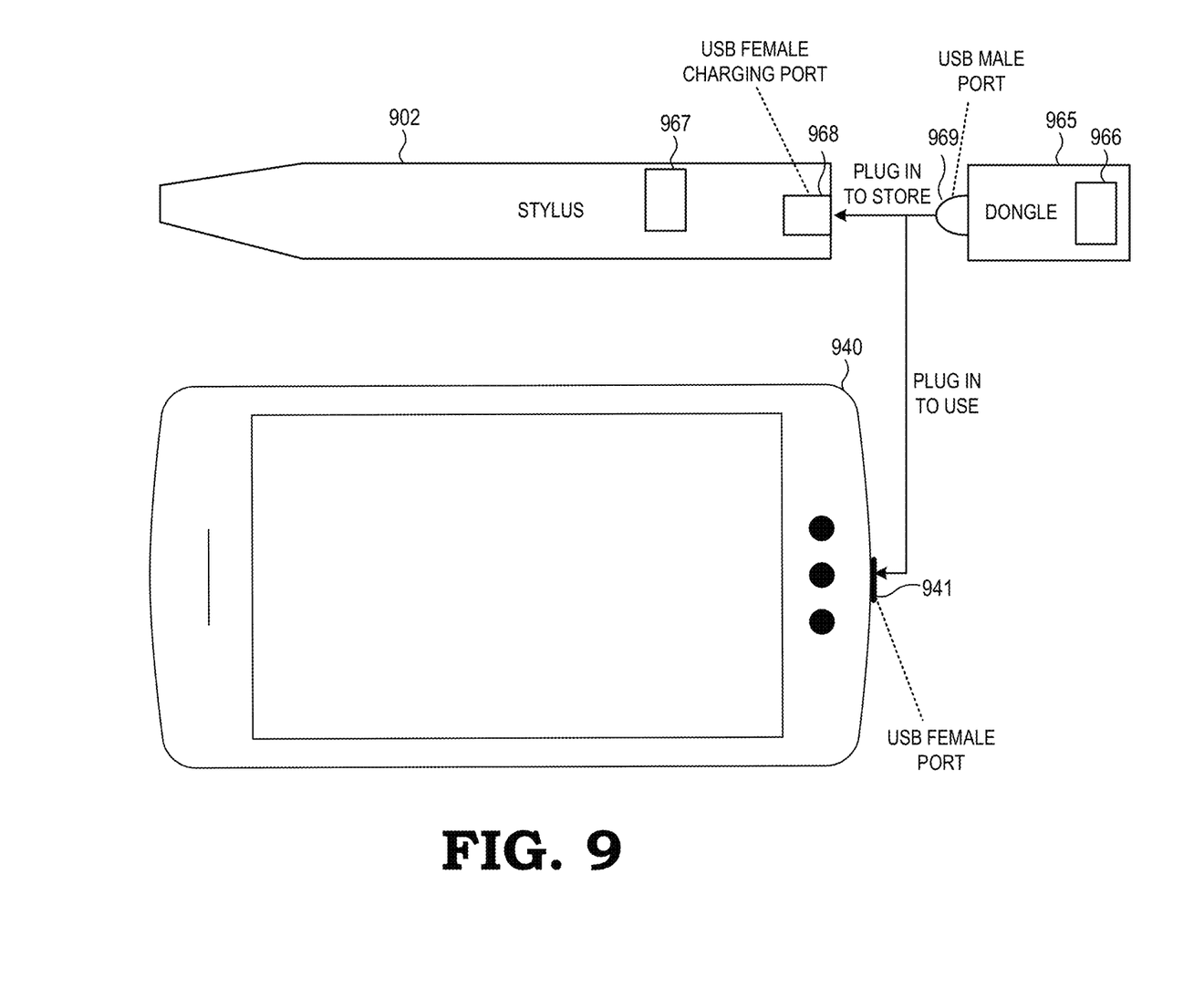
FIG. 9 is a block diagram illustrating a writing device employing pluggable dongle that can be used in conjunction with the EM position tracking systems of FIG. 1 and FIG. 2 in accordance with some embodiments.

In some embodiments, the flexibility and portability of the stylus can be enhanced by allowing the base device 104 to be removably integrated with the stylus. An example is illustrated at FIG. 9 in accordance with some embodiments. FIG. 9 illustrates a stylus 902, which in different embodiments corresponds to any of the styli 102, 602, 702, and 802 described above, or a combination thereof. FIG. 9 also illustrates a dongle 965 including an EM module 966. The EM module 966 can be an Rx EM module similar to the Tx EM module 121 of FIG. 1, or an Rx EM module similar to the Tx EM module 121 of FIG. 2. The stylus 902 includes an EM module 967 that is complementary to the EM module 966. Thus, if the EM module 966 is a Tx module then the EM module 967 is an Rx module and vice versa. The dongle 965 can therefore be mated with the connector 968 so that it is easy and convenient for the user to carry the dongle 965 with the stylus 902. In some embodiments, the stylus 902 provides power from a battery (not shown) or other power source to the dongle 965 via the connector 968 to charge a battery (not shown) that provides power to the EM module 966.

The dongle 966 can be plugged into a USB port of a computer device, such as smartphone 940 at USB port 941. While plugged into the USB port 941 the EM module 966 is active, either transmitting or receiving the EM field 125, allowing the smartphone 940 to identify poses based on EM pose data as described above with respect to FIG. 1. In some embodiments the dongle 966 itself includes a processor to identify pose data, reducing processing load at the smartphone 940. It will be appreciated that other configurations and form factors for the dongle 960 are possible. For example, in some embodiments the dongle 960 has a "cap" form factor that can fit over the tip of the stylus 902.

In some embodiments, the EM pose data can be used to assist in handwriting or other text or drawing identification (referred to collectively herein as "handwriting capture"). For example, in one embodiment, handwriting that is captured via the EM pose data is converted (e.g. by one or both of the processors 110 and 115, or by another processor) from handwriting to typed text through use of handwriting recognition software or optical character recognition (OCR) software. In another embodiment, the handwritten capture is converted to geometric shapes through the use of shape recognition software. Such processing can "clean up" hand-drawn diagrams or generate readable variants of charts and graphs. In another embodiment, the handwritten capture is converted to mathematical equations. Such processing can "clean up" math equations into presentable digital representations.

Using EM pose data allows for handwriting capture on a variety of surfaces, in contrast to conventional handwriting capture that requires use of a specialized surface. In particular, using EM pose data supports handwriting capture when the relative angle or orientation of the surface is unknown. For example, the user could write on a wall (where the surface is vertical) and also write on a desk (where the surface is horizontal) and the angle of the writing plane is not known a-priori.

To support handwriting capture on an unknown surface, in some embodiments the handwriting capture from stylus 102 is "fit" onto a plane to produce an accurate representation of the handwriting. For example, if the writing surface were angled at 45 degrees but the trajectories are projected onto a plane that is flat (angled at zero degrees), the resulting handwriting would look distorted. In order to preserve an accurate representation of what was handwritten, the plane of the writing surface is determined by a processor, such as the processor 110 or the processor 115. In one embodiment, the processor employs a plane-fitting algorithm to "fit" the writing trajectories to determine the plane angle. In other embodiments, the writing plane is determined "on the fly" based on what the user is writing. In other embodiments, the plane fitting is done with post-processing at the processor.

Figure 10:
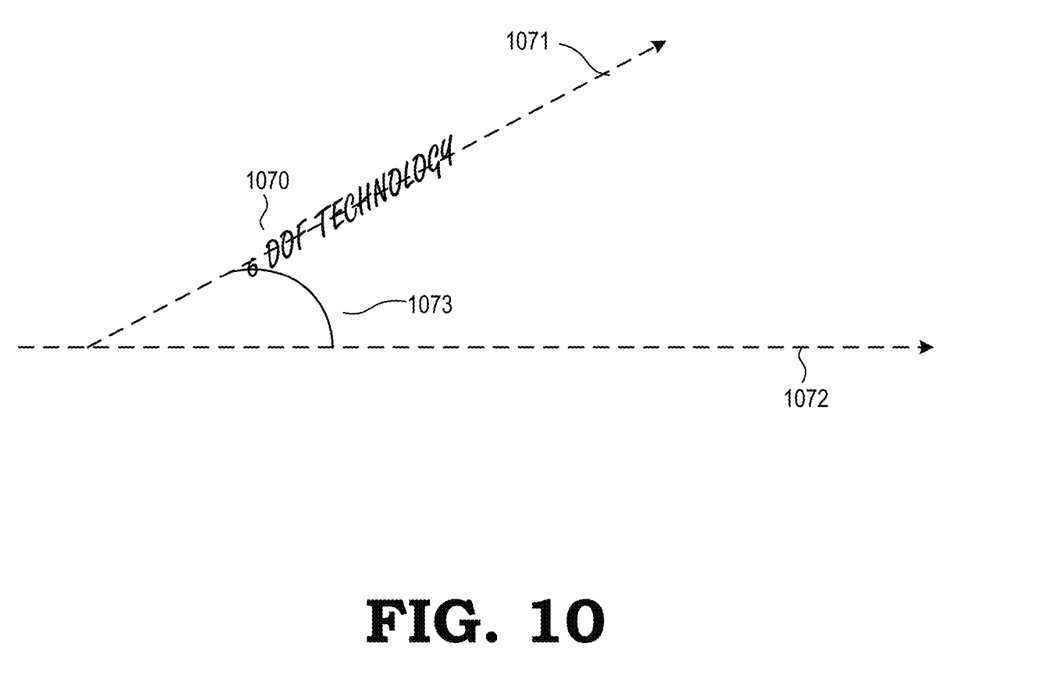
FIG. 10 is a diagram illustrating an example of employing the EM position tracking system of FIG. 1 to detect handwriting orientation in accordance with some embodiments.

In some embodiments, the processor determines the angle of writing is based on the direction of the writing. An example is illustrated at FIG. 10, which illustrates handwriting 1070 that has been written on a surface with the stylus 102. The processor 115 (or other processor) employs a heuristic to determine an angle 1073 relative to a vector 1072 that represents "horizontal" writing (e.g., left to right or right to left). The processor 115 uses the angle 1073 to correct the orientation of the handwriting prior to handwriting recognition. For example, in some embodiments the processor 115 fits a line 1071 through the handwriting and measures the angle 1073 between the fitted line and the desired angle. In other embodiments the orientation of the handwriting can be determined by a machine learning model, such as a neural network.

Figure 11:
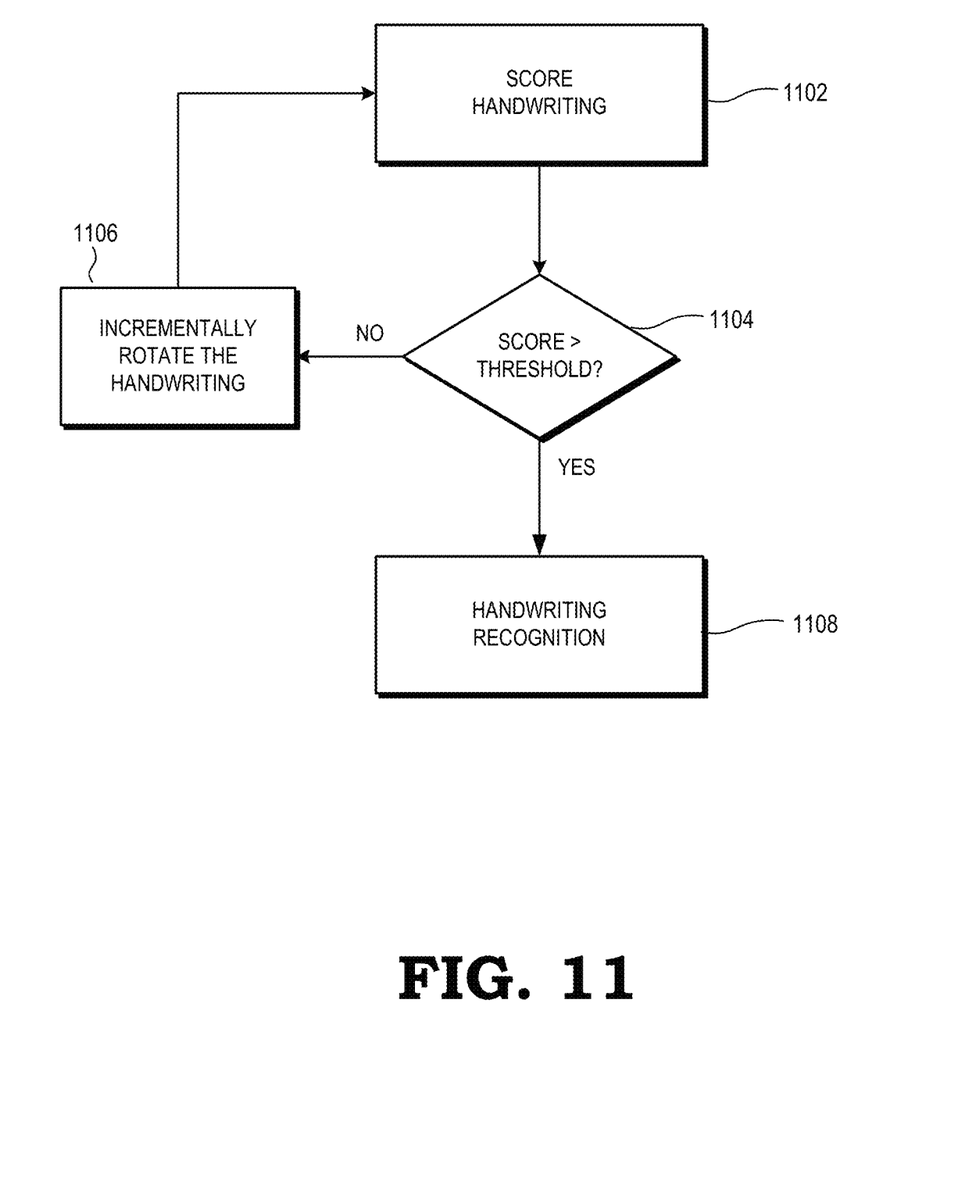
FIG. 11 is a flow diagram illustrating a method of employing the EM position tracking system of FIG. 1 to identify an orientation of handwriting on a surface for handwriting recognition in accordance with some embodiments.

In some embodiments, the processor performs orientation fitting. For example, handwriting recognition software that can recognize handwriting can incur errors if the handwriting were rotated 180 degrees so that the handwriting is upside-down. Thus, before attempting to recognize the handwriting, the processor 115 determines the "correct side up" orientation of the writing. In some embodiments, the processor attempts to rotate the handwriting by some amount, and then uses a heuristic to score the desirability of the resulting rotation. The processor repeats the process until the score crosses a threshold. An example is illustrated at FIG. 11 in accordance with some embodiments. At block 1102, the processor 115 gives the handwriting an initial orientation and an initial score based on the initial orientation. For example, in some embodiments the score can vary in a range of 0.0 to 1.0 and represents a confidence level that the handwriting is in a horizontal orientation. At block 1104, the processor 115 determines if the score exceeds a threshold. In the above example, the threshold can be a value of 0.9, indicating a threshold confidence level that the orientation of the handwriting is such that the handwriting can be interpreted by a specified handwriting recognition algorithm. If the score does not exceed the threshold, the method moves to block 1106 and the processor 115 rotates the orientation of the handwriting by a specified amount. The method returns to block 1102 and the processor 115 generates a new score based on the adjusted orientation. The processor 115 continues to incrementally adjust the orientation until, at block 1104, the score exceeds the threshold. In response to the score exceeding the threshold, the method flow moves from block 1104 to block 1108, and the processor 115 executes a handwriting recognition algorithm based on the current orientation of the handwriting (the orientation that resulted in the score exceeding the threshold.

In other embodiments, the processor 115 rotates the captured handwriting by multiple angles, and each rotation is processed in parallel to speed up the processing. In some embodiments, the scoring is performed by attempting handwriting recognition of some of the handwriting and using the level of confidence from the handwriting recognition algorithm as an input into the score. In yet other embodiments, a machine learning model is employed to estimate the angle of rotation necessary for handwriting recognition software to properly process the handwriting strokes.

Embodiments of the present disclosure include fusing of multiple data sources to improve the tracking quality of the pen device. In one embodiment, the poses from the EM position tracking subsystem are combined with poses from an IMU to reduce noise and improve angular accuracy. In some embodiments a Kalman filter is used to combine data derived from an IMU with data derived from the EM position tracking system to produce a "fused" pose. Fusion can also be used to correct for temporary distortions caused by nearby metal, for example by "dead reckoning" for short periods of time with the IMU when metallic distortion is detected.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A writing device comprising:
an electromagnetic (EM) tracking module to generate data indicative of a first EM pose of an EM transmitter in relation to an EM receiver;
a sensor to generate a first sensor pose based on sensor data; and
a processor to process the data for identification of a pose of the writing device based on a weighted combination comprising a first weight applied to the first EM pose and a second weight applied to the first sensor pose that is different from the first weight.

2. The writing device of claim 1, wherein the EM tracking module comprises an EM receiver.

3. The writing device of claim 1, wherein the EM tracking module comprises an EM transmitter.

4. The writing device of claim 1, further comprising:
a writing implement to deposit a material on a writing surface.

5. The writing device of claim 4, wherein the material comprises one of the group consisting of: graphite and ink.

6. The writing device of claim 1, wherein:
the pose is employed to track movements of the writing device at a computer device.

7. The writing device of claim 1, wherein:
the pose is employed to capture handwriting at a computer device.

8. The writing device of claim 1, wherein the writing device further comprises a writing implement, wherein the writing device includes a first end and a second end opposite the first end, and wherein the writing implement is located at the first end and the EM tracking module is located at least 1 cm distance from the first end.

9. The writing device of claim 1, wherein the sensor is selected from a group that includes an inertial measurement unit, an ultrasonic sensor, a light sensor, a sonic sensor, and a radio frequency (RF) sensor.

10. The writing device of claim 1, wherein the weighted combination is the sum of the product of the first weight applied to the first EM pose and the first EM pose and the product of the second weight applied to the first sensor pose and the first sensor pose divided by the sum of the first weight and the second weight.

11. The writing device of claim 1, wherein the processor is to process the data for identification of the pose of the writing device based on the first EM pose to manipulate one or more objects in a virtual reality (VR) environment.

12. The writing device of claim 1, wherein the electromagnetic (EM) tracking module is to measure a magnitude and/or a phase of a generated EM field.

13. The writing device of claim 1, wherein the EM tracking module comprises fewer than three EM coil axes.

14. The writing device of claim 13, wherein the writing device comprises a stylus, and wherein an EM coil axis is wound around a long axis of the stylus.

15. The writing device of claim 1, wherein the EM tracking module comprises a magnetometer.

16. The writing device of claim 1, further comprising:
a force sensor to indicate that a force applied to a tip of the writing device has exceeded a threshold.

17. The writing device of claim 1, further comprising:
a sensor to indicate a two-dimensional position of a tip of the writing device relative to a writing surface; and
wherein the processor is to identify a pose of the tip based on the two-dimensional position of the tip.

18. The writing device of claim 17, wherein the sensor is selected from a group that includes a roller tracker and an optical tracker.

19. The writing device of claim 1, further comprising:
a base device which comprises one of the EM transmitter and EM receiver and which is removably integrated with the writing device.

20. The writing device of claim 19, the base device further comprising:
a dongle that comprises the other of the EM transmitter and EM receiver.

21. The writing device of claim 20, wherein the dongle is removably coupled to an end of the writing device.

22. A method, comprising:
receiving first electromagnetic (EM) pose data based on EM field values indicative of a first pose of an EM transmitter in relation to an EM receiver;
receiving first sensor data indicative of a first sensor pose; and
determining a pose of a writing device based on a weighted combination comprising a first weight applied to the first EM pose data and a second weight applied to the first sensor data that is different from the first weight.

23. The method of claim 22, wherein the writing device comprises the EM receiver.

24. The method of claim 22, wherein the writing device comprises the EM transmitter.

25. The method of claim 22, further comprising:
tracking movements of the writing device at a computer device.

26. The method of claim 22, wherein the weighted combination comprises: is the sum of the product of the first weight applied to the first EM pose and the first EM pose and the product of the second weight applied to the first sensor pose and the first sensor pose divided by the sum of the first weight and the second weight.

27. The method of claim 26, wherein the first sensor is selected from a group that includes an inertial measurement unit and an ultrasonic sensor.

28. The method of claim 22, further comprising:
receiving force data received from a force sensor of the writing device; and
determining if the writing device is contacting a surface based on the force data.

29. The method of claim 22, wherein the EM field values are at least partially indicative of a generated EM field, and wherein a magnitude and/or a phase of the generated EM field is measured so that the first EM pose data is based on EM magnitude and/or phase field values indicative of the first pose of the EM transmitter in relation to the EM receiver.

30. The method of claim 22, further comprising:
capturing handwriting based on the pose of the writing device.

31. The method of claim 30, further comprising:
fitting the captured handwriting to a plane.

32. The method of claim 30, further comprising determining an orientation of the handwriting by:
iteratively rotating the captured handwriting;
for each iteration, determining an orientation score; and
selecting an orientation of the captured handwriting in response to the orientation score exceeding a threshold.

33. The method of claim 30, further comprising:
determining a direction of the captured handwriting; and
determining an orientation of the captured handwriting based on the direction.

34. The method of claim 30, further comprising:
determining an orientation of the captured handwriting based on a machine learning model.

35. The method of claim 30, further comprising:
converting the captured handwriting to digital characters.

* * * * *

UNITED STATES PATENT AND TRADEMARK OFFICE
CERTIFICATE OF CORRECTION

PATENT NO. : 11,762,485 B2
APPLICATION NO. : 17/283764
DATED : September 19, 2023
INVENTOR(S) : Sherk Chung et al.

It is certified that error appears in the above-identified patent and that said Letters Patent is hereby corrected as shown below:

In the Claims

At Column 12 Line 60, please correct "comprises: is the" to be --comprises: the--

Signed and Sealed this
Sixteenth Day of April, 2024

Katherine Kelly Vidal
*Director of the United States Patent and Trademark Office*